Feb. 13, 1923.
R. A. CARLSON
SAFETY ATTACHMENT FOR AIR BRAKE SYSTEMS
Filed Oct. 19, 1921
1,445,002
2 sheets-sheet 1
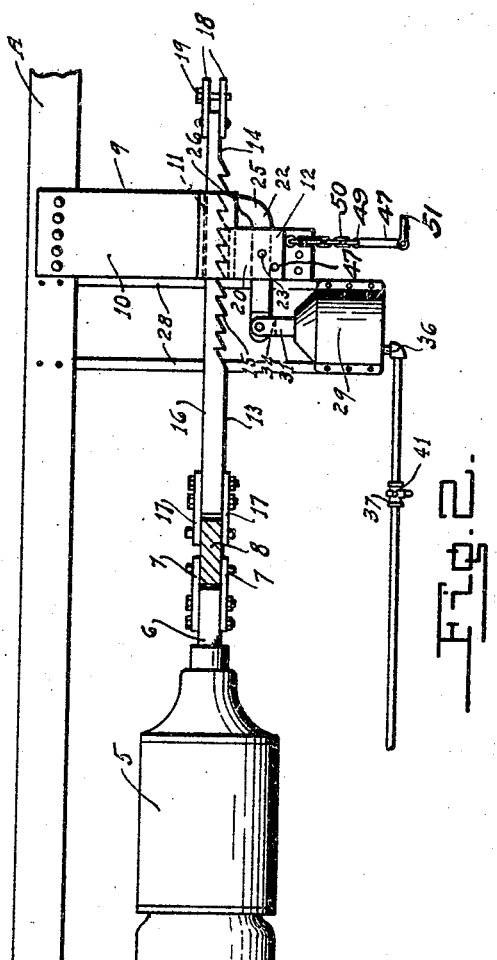
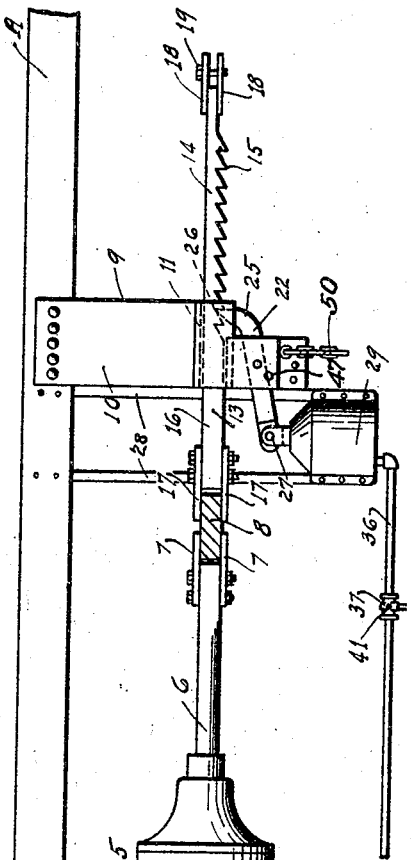
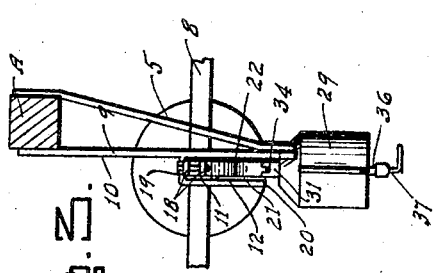
Inventor
Robert A. Carlson
By Watson E. Coleman Attorney Feb. 13, 1923.
R. A. CARLSON
1,445,002
SAFETY ATTACHMENT FOR AIR BRAKE SYSTEMS
Filed Oct. 19, 1921
2 sheets-sheet 2

Inventor

Robert A. Carlson

By Watson E. Coleman Attorney

Patented Feb. 13, 1923.

1,445,002

UNITED STATES PATENT OFFICE.

ROBERT A. CARLSON, OF VIRGINIA, MINNESOTA.

SAFETY ATTACHMENT FOR AIR-BRAKE SYSTEMS.

Application filed October 19, 1921. Serial No. 508,693.

*To all whom it may concern:*

Be it known that I, ROBERT A. CARLSON, a citizen of the United States residing at Virginia, in the county of St. Louis and State of Minnesota, have invented certain new and useful Improvements in Safety Attachments for Air-Brake Systems, of which the following is a specification, reference being had to the accompanying drawings.

This invention relates to a safety attachment for air brake systems and has for its object to provide a device of this character that may be used in connection with the conventional form of air brake to permit release of the brakes.

It is another object of the invention to provide a device of this character which substantially locks the brakes in their set positions by mechanical means, said locking means being released upon admission of air to the air brake system.

It is also an object of the invention to provide an attachment of this character including a tooth bar arranged for connection to the air brake mechanism, and a mechanically applied pneumatic release pawl for controlling movement of the rack bar and brake mechanism to which it is connected.

It is a further object of the invention to provide an attachment of this character including a bracket adapted to support a rod and a pawl, the rod being provided at its ends for connection to the air brake system and hand brake mechanism, means for urging said pawl into engagement with the rack bar upon exhaust of the air from the air brake system, said means being operable to urge the pawl into engagement with the tooth bar upon exhaust of air from the housing of said means.

It is still a further object of the invention to provide an attachment of this character including means carried by the bracket for rendering the pawl inoperative when the locking of the tooth bar is not desired.

With these and other objects in view, the invention consists in the improved construction and arrangement of parts to be hereinafter more particularly described, fully claimed and illustrated in the accompanying drawings, in which:—

Figure 1 is a view in elevation showing the attachment in its released position;

Figure 2 is a view in elevation showing the safety atachment in its locked position;

Figure 3 is an elevation of the structure shown in Figure 1;

Figure 4:
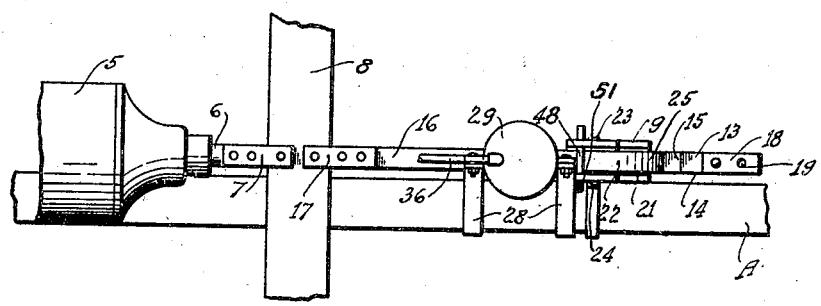
Figure 4 is a bottom plan view.
Figure 5:
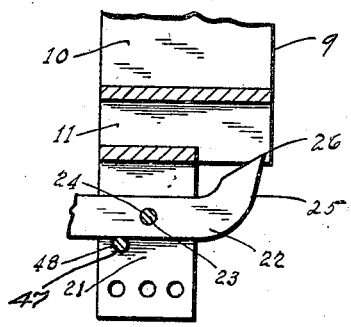
Figure 5 is a fragmentary elevation and sectional view of the bracket.
Figure 6:
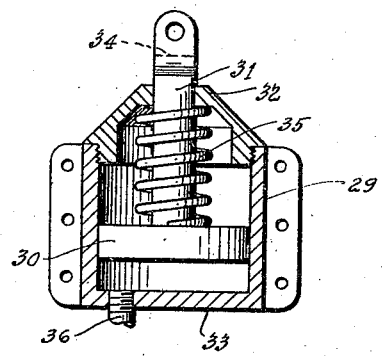
Figure 6 is a sectional view of the auxiliary cylinder.
Figure 7:
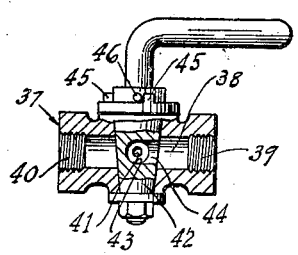
Figure 7 is a sectional view of the valve.
Figure 8:
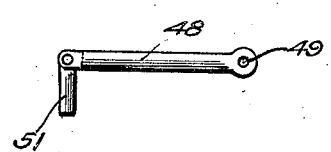
Figure 8 is a detail view of the stop or locking pin.

This attachment or appliance may be disposed either in a vertical or horizontal position. For the purpose of illustration, it is shown in a vertical position, such as it would occupy when used in connection with dump cars. In the drawings, A designates the frame of a dump car and 5 the brake cylinder of the air brake mechanism. The mechanism for the admission of air to the brake cylinder used in connection with this invention is of conventional form. The usual piston 6 is slidable in the cylinder and is adapted to be moved outwardly of the cylinder to apply the brakes upon the admission of air into the cylinder. The end of the piston is provided with plates 7 between which a portion of one of the brake cylinder levers 8 of the air brake mechanism is disposed. The mechanism just described forms no part of the invention, but is used to connect the invention to the air brake system.

Depending from the frame A of the car is a bracket 9, said bracket having a relatively broad upper portion 10 from which a housing 11 projects, the housing being disposed substantially at the intermediate portion of the plate or bracket. The lower end portion 12 has one side thereof removed to prevent interference with the operation of the attachment and also to open a portion of the bottom of the housing 11.

The housing 11 is intended to receive a bar 13 having its end portion 14 provided with a series of rack teeth 15, said teeth terminating substantially at the intermediate portion of the bar. The end portion 16 of the bar is smooth and is adapted to slide through the housing 11. It is also obvious that if necessary the teeth of the bar may slide through the housing 11 as the edges of the teeth are disposed substantially in the plane of the portion of the bar engaged with the bottom of the housing, so that there is no danger of the teeth catching in the edge of the housing. The end 16 of the bar 13 is provided with a pair of plates 17 which are arranged to be connected to the member 8 so that operation of the piston of the brake cylinder will cause at certain times movement of the bar 13. The end 14 of the bar 13 is provided with a pair of plates 18. A pin 19 is passed through the plates 18 for the purpose of connecting the chain of the hand brake mechanism (not shown) to the bar 13. By this means the safety attachment will operate regardless of the method by which the brakes are applied, whether manually or pneumatically.

The housing 11 is provided with an extension 20 which projects below the lower wall of the housing to substantially provide a compartment 21 adapted to receive a pawl 22. A pintle 23 is passed through the extension 20 and into the opposite portion of the bracket 9, said pintle also passing through an opening 24 provided in the pawl 22, whereby the pawl is pivoted within the compartment 21. The end 25 of the pawl projects beyond the compartment 21 and is directed to one side to provide a tooth 26 adapted to engage the teeth 15. It will be noted that the pawl is pivoted to one side of its center, the greater portion of the pawl extending outwardly of the compartment and having its extremity provided with an opening 27.

Connected to the frame by any suitable means such as by brackets 28, is an auxiliary cylinder 29, smaller than the brake cylinder. Slidable in the cylinder is a piston 30 having a piston rod 31 which extends through the end 32 of the casing, the end 33 of the casing being closed. The end of the piston rod extending through the cylinder is bifurcated as at 34 and adapted to receive the end of the pawl 22, a pin being passed through the bifurcated end of the piston and the opening 27 to pivotally connect the pawl to the piston. Surrounding the piston rod within the cylinder is an expansion spring 35 which is adapted to operate similar to the spring for operating the piston of the brake cylinder. Passing through the end 33 of the cylinder is a conduit 36 which extends to the main air line of the air brake system. Interposed in the conduit 36 is a valve 37. The valve 37 comprises a casing 38 having registering ports 39 and 40, said ports being adapted to receive the adjacent ends of the conduit 36. A relatively small outlet opening 41 is provided in the side wall of the casing 38 and centrally of the portion of the casing occupied by or in which the valve 42 is disposed. The valve 42 of the casing has a passage 43 extending therethrough and adapted to permit communication of the sections of the conduit 36 whereby air may enter the cylinder 29, said passage corresponding to the size of the openings in the ports 39 and 40 of the casing. Extending through one side wall of the valve and communicating with the passage 43 is a discharge or outlet port 44, which communicates with the port 39. This port is not intended to register with the port 41 so that when the valve is open there is no danger of the air escaping through the port 41. The purpose of the ports 41 and 44 is to permit the air in the cylinder 29 to escape when the valve 37 is closed. This is accomplished by causing the lower portion of the passage 43 of the valve to register with the port or opening 41 in the valve casing. This disposes the port 44 in communication with the port 39 of the valve casing and permits the air in the cylinder 29 to bleed from the valve 37. The movement of the valve 42 is limited by its stops 45 and 46.

In operation, when air is admitted to the brake cylinder 5 in the setting operation of the brakes, the tooth or rack bar 13 slides through the housing 11 and over the tooth 26 of the pawl, and air is at this time being exhausted from the cylinder 29 so as to permit the spring 31 to force the pawl into engagement with the bar and to prevent the same from retracting. By this novel arrangement should the car on which the device is used become separated or uncoupled from the remainder of the train, the air in the brake cylinder would naturally become exhausted, causing the spring of the brake system to operate the brake piston and release the brakes. Reverse movement of the rack bar 13 under these conditions however, is impossible, in view of the fact that the spring 31 has previously urged the tooth of the pawl into engagement with the rack bar 13 thereby locking the members in their set positions and preventing the brake piston from operating so that regardless of the fact that the air in the air brake mechanism has been exhausted it does not affect the position of the brakes. When the train is again coupled and air admitted to the air brake system, the valve 37 being open permits the entrance of air into the cylinder 29 thereby overcoming the tension of the spring 31, and moving the pawl 25 away from the rack bar 13 whereupon the piston of the brake cylinder may operate to release the brakes.

If it is not desired to use the safety appliance the same may be rendered inoperative by charging the air brake system so as to operate the piston 30 within the cylinder 29 and move the pawl to its inoperative position or disengaged position with respect to the rack bar 13. The extension 20 and the adjacent portion of the bracket 9 are provided adjacent the pivot of the pawl 22 with registering openings 47 adapted to receive a stop pin 48, said pin having an eyelet 49 at one end for the reception of one end of a chain 50, the opposite end of which is connected to the bracket 9. The opposite end of the pin 48 has a finger 51 pivoted thereto, said finger being adapted to extend at right angles to the pin 48. The pin 48 is adapted to be positioned in the opening 47 beneath the pawl 22. The valve 37 is then closed so as to permit registration of the port 41 with the port 43 of the valve. The air in the cylinder 29 will then bleed from said registering ports and the pawl urged into engagement with the pin 48. The device will then remain inoperative regardless of the action of the air brake system until the pin 46 is removed and the valve 37 opened.

From the foregoing it will be readily seen that this invention provides a novel attachment for air brake systems capable of being applied to the conventional form of air brake mechanism without altering the air brake system in any manner. At the same time, the device is automatic in its operation so that it is impossible for the brakes to become accidentally released should the air become accidentally exhaused from the air brake system. The device also works as well with a hand brake used in connection with the air brake system so that if the hand brake as well as the air brake mechanisms are in danger of becoming released the attachment will still hold the brakes in their set position.

What is claimed is:—

A safety attachment for air brake systems comprising a stationary bracket including a housing and a compartment, a rack bar slidable in said housing and operatively connected at its ends to the air brake mechanism, a pawl pivoted within the compartment beneath the rack bar, one end of said pawl being adapted to extend into the housing into engagement with the rack bar, a cylinder disposed adjacent the housing, a piston in said cylinder, the opposite end of said pawl being connected to the piston, said cylinder being in communication with the air brake system, and a stop pin adapted to be disposed transversely of the compartment in the path of movement of the pawl, and means disposed in communication with the cylinder to prevent the admission of air and permit the exhaust of air within the cylinder to render the pawl inoperative through the medium of the stop pin.

In testimony whereof I hereunto affix my signature.

ROBERT A. CARLSON.